United States Patent [19]

Kakimoto

[11] Patent Number: 5,828,061
[45] Date of Patent: Oct. 27, 1998

[54] APPARATUS FOR DETECTING A ROTATION ANGLE OF A DIFFRACTION GRATING

[75] Inventor: Tatsuki Kakimoto, Hiratsuka, Japan

[73] Assignee: Anritsu Corporation, Tokyo, Japan

[21] Appl. No.: 718,594

[22] PCT Filed: Dec. 13, 1995

[86] PCT No.: PCT/JP95/02547

§ 371 Date: Sep. 26, 1996

§ 102(e) Date: Sep. 26, 1996

[87] PCT Pub. No.: WO96/26414

PCT Pub. Date: Aug. 29, 1996

[30] Foreign Application Priority Data

Feb. 24, 1995 [JP] Japan ................................. 7-037070

[51] Int. Cl.$^6$ ................................................ G01J 3/18
[52] U.S. Cl. ................. 250/237 G; 250/236; 356/328; 356/334
[58] Field of Search ............................ 250/237 G, 226, 250/231.13, 231.14, 231.16, 231.17, 231.18, 230, 233, 236, 216; 356/334, 328, 329, 321, 323, 324, 325, 326, 305, 302, 300, 319, 320; 372/20, 32, 102

[56] References Cited

U.S. PATENT DOCUMENTS

| | | | |
|---|---|---|---|
| 4,692,883 | 9/1987 | Nelson et al. | 356/334 |
| 4,804,266 | 2/1989 | Barshad . | |
| 4,916,645 | 4/1990 | Wuest et al. | 356/331 |
| 4,930,892 | 6/1990 | Hadbawnik et al. . | |
| 4,969,740 | 11/1990 | Sonobe | 356/334 |
| 4,971,439 | 11/1990 | Brown | 356/334 |
| 5,268,737 | 12/1993 | Fukuma et al. | 356/334 |
| 5,557,404 | 9/1996 | Matsui et al. | 356/334 |
| 5,625,270 | 4/1997 | Barker | 356/334 |
| 5,691,989 | 11/1997 | Rakuljic et al. | 372/20 |

FOREIGN PATENT DOCUMENTS

| | | |
|---|---|---|
| 55-43411 | 3/1980 | Japan . |
| 63-295934 | 12/1988 | Japan . |
| 1-197617 | 8/1989 | Japan . |
| 2-82125 | 3/1990 | Japan . |
| 3-77034 | 4/1991 | Japan . |
| 6-112583 | 4/1994 | Japan . |
| 2 271 463 A | 4/1994 | United Kingdom . |

OTHER PUBLICATIONS

Y. Sonobe; "MV02 Series Optical Spectrum Analyzers"; Jul. 1991; pp. 36–49; Anritsu Technical Review No. 13.

Stewart E. Miller et al; Optical Fiber Telecommunications II; 1988; pp. 533–536; Academic Press, Inc. (No Month).

(List continued on next page.)

Primary Examiner—David C. Nelms
Assistant Examiner—John R. Lee
Attorney, Agent, or Firm—Frishauf, Holtz, Goodman, Langer & Chick

[57] ABSTRACT

In order to improve the accuracy of the absolute value of a wavelength of diffraction light in a diffraction grating, a gas absorption line resulting from an absorption cell 8 is used as a wavelength reference 8. When reference light is exited from a light source 7 in a wavelength reference light source 1, the reference light is transmitted to a diffraction grating 2 as transmitted light having a spectrum absorbing only light of a predetermined wavelength by the absorption cell 8 to allow it to be reciprocated in a predetermined angle range. The diffraction grating 2 produces a split light beam from the transmitted light from the absorption cell 8. The diffraction grating 2 splits the transmitted light from the absorption cell 8 to provide diffracted light and the diffracted light from the diffraction grating 2 is received by the reference light receiving unit 3. It is possible to, without being affected by a variation in the environmental condition, accurately know the rotation angle of the diffracting grating 2 from the diffracted light of the absorption line-existing waveform component received by the reference light receiving unit 3, that is, the rotation angle of the diffraction grating 2 at a wavelength at that time.

13 Claims, 8 Drawing Sheets

OTHER PUBLICATIONS

Y. Sakai et al; "Frequency Stabilization of Laser Diodes Using 1.55 μm Absorption Lines of $^{12}C_2H_2$ and $^{13}C_2H^2$"; Jan. 1992; p. 75–81; IEEE Journal of Quantum Electronics, vol. 28, No. 1.

H. Tsuchida et al; "Frequency Stabilization of AlGaAs Semiconductor Laser Based on the $^{85}Rb-D_2$ Line"; Sep. 1982; pp. L561–L563; Japanese Journal of Applied Physics.

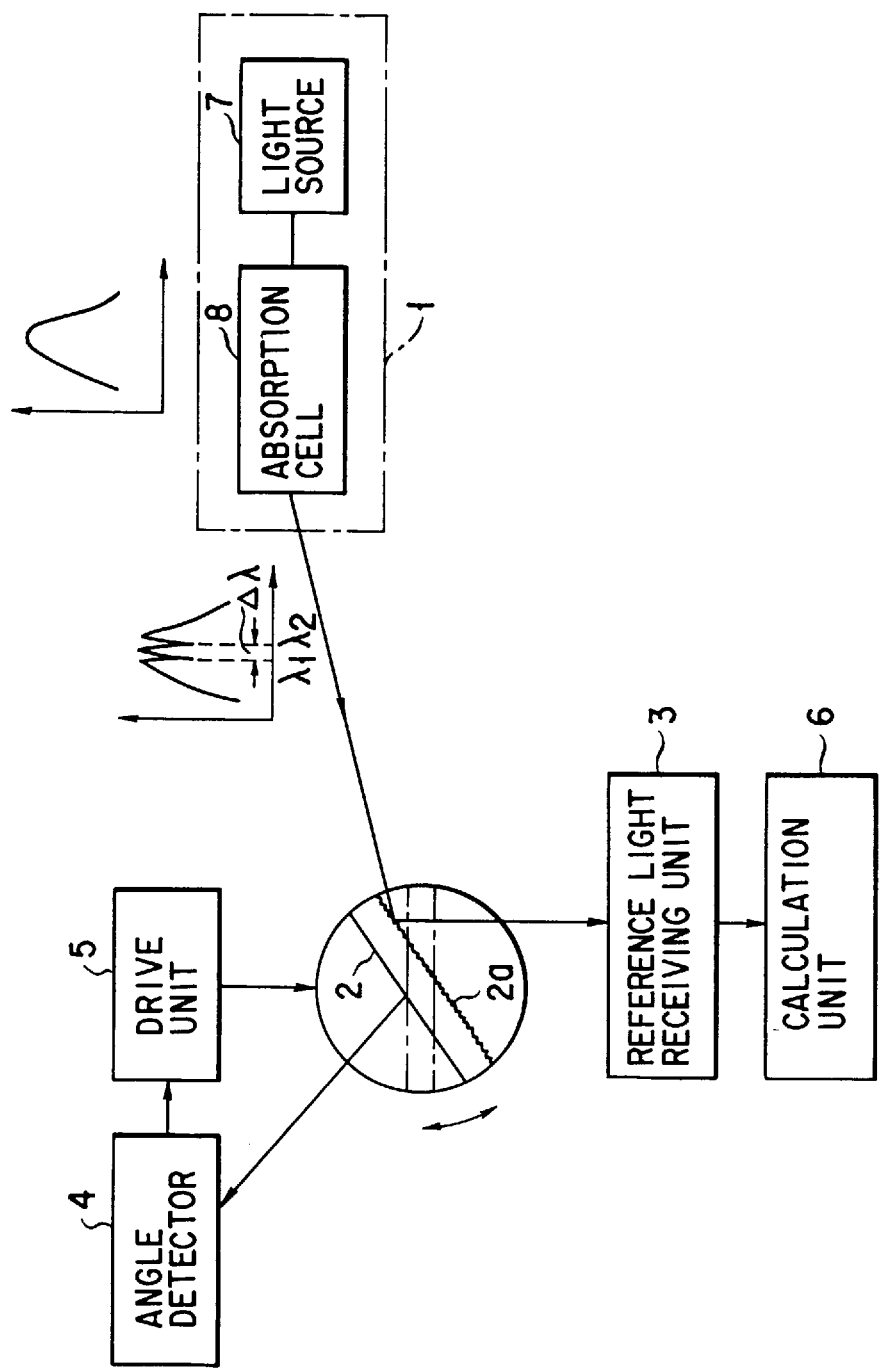
F I G. 1

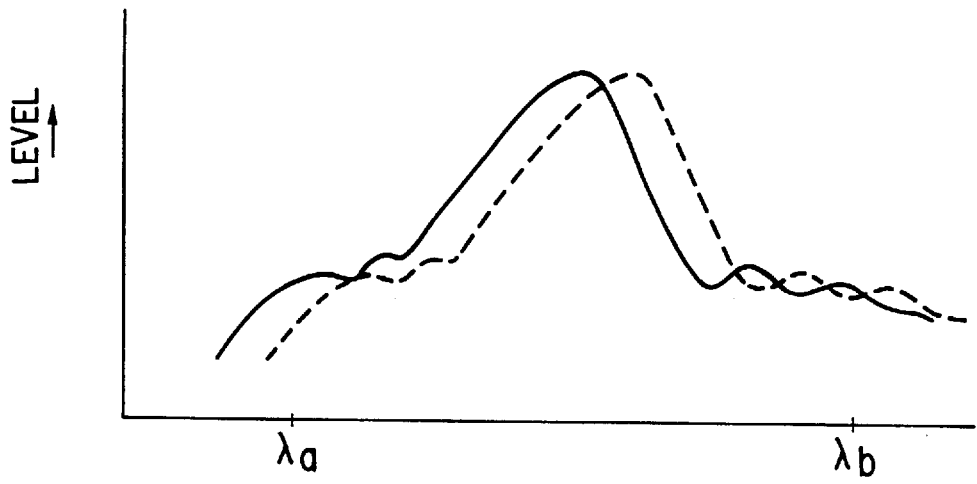
F I G. 6A
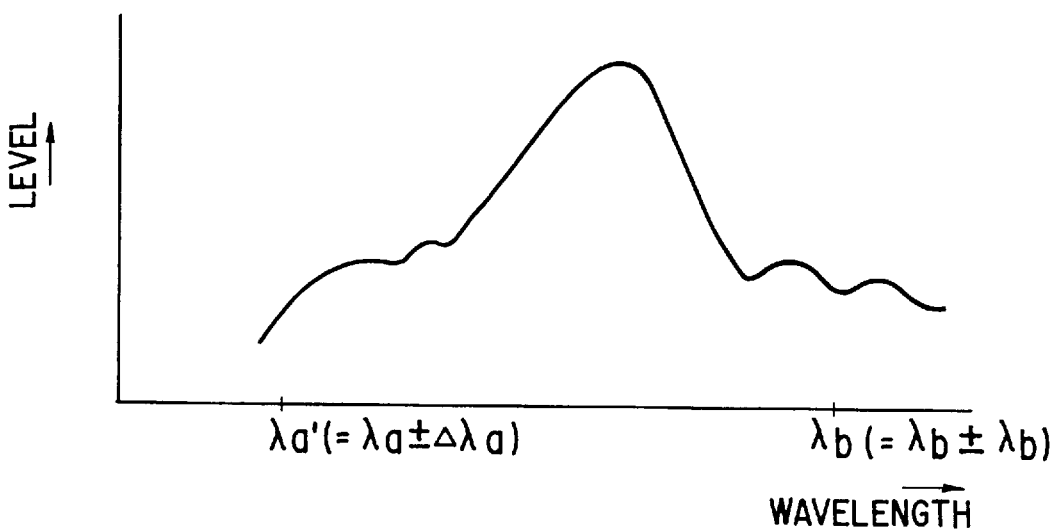
F I G. 6B 5,828,061

APPARATUS FOR DETECTING A ROTATION ANGLE OF A DIFFRACTION GRATING

TECHNICAL FIELD

The present invention relates to an apparatus for detecting a rotation angle of a rotatable diffraction grating generally used for an optical apparatus and, in particular, an apparatus for detecting a rotation angle of a diffraction grating applicable to an optical spectrometer apparatus (optical spectrum analyzer), a tunable wavelength light source, etc.

BACKGROUND ART

The diffraction grating used in the field of an optical apparatus is rotatable as well known, has a great number of grooves provided on its surface in a predetermined interval, and is composed of an element for generating diffracted light due to an interference of light reflected at those smooth surfaces between grooves in accordance with an incident angle of light.

As an optical apparatus using such diffraction grating there has been known a light spectrum analyzer as shown in FIG. 8 (see Anritsu Technical Review No. 13, July 1991, pp 36 to 49).

When a wavelength distribution, etc., of light under consideration is measured in the optical spectrum analyzer, a diffraction grating 31 has its rotation controlled by a motor 33 while its rotation angle is detected by an angle detector 32, such as an encoder, potentiometer, etc.

The light to be measured is split by the diffraction grating 31.

The exit light split by the diffraction grating 3 is narrowed down, by a slit 34 in a slit mechanism 34, on a focusing position and then received by a light receiving unit 35 and displayed as spectra on a display unit, not shown.

Upon the measurement of the waveform distribution (spectra) of the light to be measured in this kind of a light spectrum analyzer, the absolute value of the waveform relative to the to-be-measured light is first found from a theoretical diffraction angle inherent in the diffraction grating 31.

The rotation angle of the diffraction grating 31 is controlled by setting the absolute value of the waveform so as to correspond to the pulse number of an encoder as the angle detector 32 or to a voltage of potentiometer. Stated in more detail, a number is allocated to a pulse output from the encoder as the angle detector 32, or to a voltage of the potentiometer, for each predetermined angle in a rotatable angle range of the diffraction grating 31, so that the absolute value of the waveform is allocated to the corresponding number.

FIG. 9 shows the diffraction order of the diffracted light by the diffraction grating 31 of this kind and its diffraction.

For example, let it be assumed that light of wavelength 1 μm is incident at an angle of incidence of 15° with respect to a normal N. Then the light is diffracted in 10 directions, that is, with the order of diffraction, m=−3, −2, −1, 0, 1, 2, 3, 4, 5, 6.

The light receiving unit 35 of the light spectrum analyzer as shown in FIG. 8 receives diffracted light of the order m=1, 2.

In this case, the angle of diffraction, βm, of the incident light is found from the following equation (1).

$$m\lambda = d\cos\theta(\sin i + \sin\beta m) \quad (1)$$

where d : groove-to-groove interval of the diffraction grating;

i : angle of incidence;

θ: angle of the incident light made with respect to an XY plane;

λ: absolute wavelength of the incident light; and m : order of diffraction. (m=0, ±1, ±2, . . . )

Further, a tunable wavelength light source is known as an optical unit utilizing this kind of diffraction grating (see Optical Fiber Telecommunications II, pp 533 to 536, Academic Press, Inc. 1988).

This tunable wavelength light source is such that exit light from a laser diode 36 is reciprocably moved back and forth relative to a diffraction grating 31 and resonated light is output from the other end of the laser diode 36.

Such an external cavity type tunable light source is such that the wavelength of output light from the other end of the laser diode 36 is variably controlled by varying the rotation angle of the diffraction grating 31 by means of a motor 33.

Like the above-mentioned optical spectrum analyzer, the diffraction grating 31 has its rotation controlled by the motor 33 while rotation angle is detected by an encoder and an angle detector 32 such as a potentiometer.

In the above-mentioned optical spectrum analyzer and tunable wavelength light source, however, if the environmental condition, such as the ambient temperature, humidity and pressure, varies, then the diffraction angle of the diffracted light from the diffraction grating 31 varies because the refractive index of air as well as the groove-to-groove interval of the diffraction grating 31 delicately varies.

Due to an adverse effect resulting from the variation of the environmental condition, the absolute value of the wavelength of diffracted light from the diffraction grating 31 is not always in agreement with the theoretical value and varies, thus lowering the accuracy in the measurement of the waveform. In the above-mentioned optical spectrum analyzer and tunable wavelength light source, therefore, it is not possible to measure a stable wavelength distribution at all times and output light of a desired wavelength.

For example, let it be assumed that, as the environmental condition, the temperature of 25° C., humidity of 50% and atmospheric pressure 1 hPa are provided as a reference. If, in this case, the environmental condition varies in a range of 5° to 45° C. in temperature, 0 to 90% in humidity and 0.95 to 1.05 hPa in atmospheric pressure, the accuracy with which the wavelength is measured by the optical spectrum analyzer is 0.5 nm and the accuracy of the waveform of exit light from the tunable wavelength light source is 0.1 nm.

As the method for securing these accuracies it is considered that the optical spectrum analyzer and tunable wavelength light source are held in a thermostatic and in a vacuum container for management. This makes an apparatus bulkier as a whole and is not practical.

That is, this problem arises from the fact that it is not possible to accurately detect the rotation angle of the diffraction grating because it is affected by a variation in the environmental condition.

DISCLOSURE OF INVENTION

The present invention has been conceived with consideration given to the above-mentioned problem and pays attention to the fact that, if, as a wavelength reference, use is made of a gas absorption line not affected by the absolute values of a waveform even under a variation in the environmental condition it is possible to accurately detect the rotation angle of a diffraction grating and hence to pick up accurate diffraction angle data at all times from the diffraction grating and an object of the present invention is to provide an apparatus for detecting a rotation angle of a diffraction grating which is applicable to an optical spectrum analyzer capable of improving the accuracy of the absolute values of a wavelength of diffracted light in the diffraction grating and effecting high-accuracy measurement and a tunable wavelength light source capable of exiting light of a stable, desired wavelength.

According to one aspect of the present invention there is provided an apparatus for detecting a rotation angle of a diffraction grating which includes a rotatable diffraction grating for receiving incident light and exiting split beams, a drive unit for rotating the diffraction grating, and an angle detecting unit for detecting a rotation angle of the diffraction grating, comprising:

a light source unit including a light source and absorption cell and for exiting, to the diffraction grating, reference light of a region including a specified wavelength determined depending upon the absorption cell;

a reference light receiving unit for receiving a split reference light from the diffraction grating and converting the split reference light into an electric signal; and a signal processing unit for detecting an extreme value of the electric signal from the reference light receiving unit by rotating the diffraction grating by the drive unit, receiving a rotation angle output from the angle detecting unit when the extreme value is detected, and calculating a specified rotation angle corresponding to the specified wavelength.

BRIEF DESCRIPTION OF DRAWINGS

FIG. 1 is a schematic view showing an arrangement of an apparatus, according to a first embodiment of the present invention, for detecting a rotation angle of a diffraction grating;

FIGS. 6A and 6B are views showing the correction of substantial graduations on a display screen on the basis of correction data;

BEST MODE OF CARRYING OUT THE INVENTION

Figure 2:
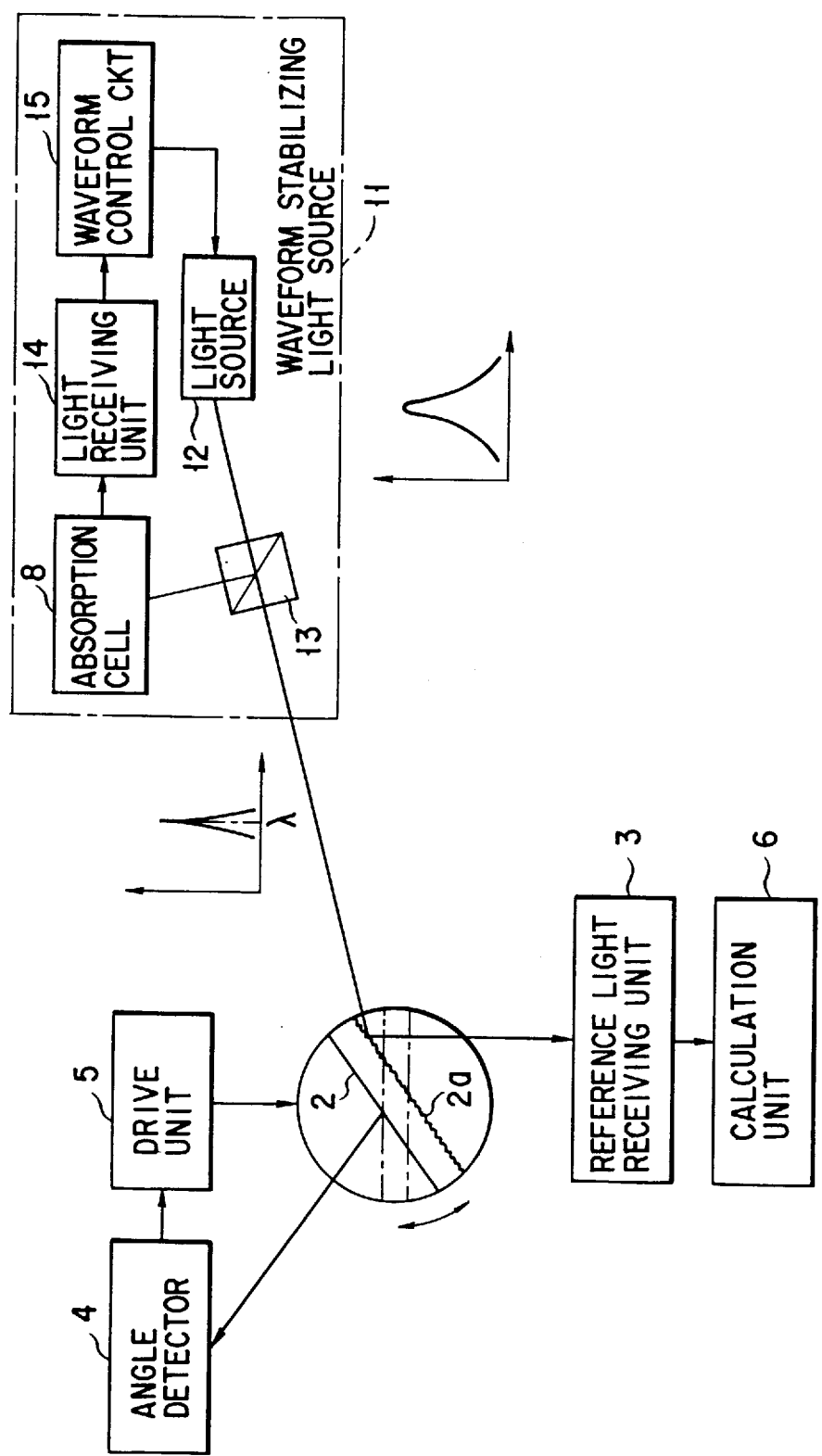
FIG. 2 is a schematic view showing an arrangement of an apparatus, according to a second embodiment of the present invention, for detecting a rotation angle of a diffraction grating.

The embodiments of the present invention will be explained below with reference to the accompanying drawings.

FIG. 1 is a diagrammatic view showing a diffraction grating's rotation angle detecting apparatus according to the present invention.

The rotation angle detecting apparatus shown in FIG. 1 comprises a wavelength reference light source 1, a diffraction grating 2, a reference light receiving unit 3, an angle detector 4, a drive unit 5 and a calculation unit (signal processing unit) 6.

The wavelength reference light source 1 comprises a light source 7 and an absorption cell 8.

The light source 7 is comprised of a white color light source, or an SLD (superluminescent diode), for outputting light containing various wavelengths, so as to output a light beam of a predetermined wavelength.

The absorption cell 8 is comprised of a tube sealed with a gas having an absorption line absorbing the light of a predetermined wavelength at all times without being affected by a variation in the environmental condition.

For example, as a gas possessing an absorption line in a 1.5 $\mu$m band there are $C_2H_2$, $CO_2$, $NH_3$, $H_2O$, HCN, $CH_3Cl$, etc.

Further, as a gas possessing an absorption line in a 1.3 $\mu$m band, there are $CH_4$, $NH_3$, $H_2O$, HF, etc.

As a gas possessing an absorption line in a 0.8 $\mu$m band there are $H_2O$, Rb, Cs, etc.

As documents for these gas absorption lines, there are, for example, Frequency Stabilization of Laser Diode Using 1.51–55 $\mu$m Absorption Lines of $^{12}C_2H_2$ and $^{13}C_2H_2$, IEEE Journal of Quantum Electronics, Vol. 28, No. 1, January 1992, pp 75 to 81 and Frequency Stabilization of AlGaAs Semiconductor Laser Based on the $^{85}$Rb-$D_2$ Line, Japanese Journal of Applied Physics, Vol. 21, No. 9, September, 1982, pp L561–L563, etc.

The absorption cell 8 using such a specified gas allows light from the light source 7 to exit to the diffraction grating 2 as transmitted light possessing a spectrum absorbing only a given waveform component, that is, a component having an absorption line inherent in that specified gas.

In this case, as set out above, the wavelength reference light source 1 uses the white color light source or SLD and its output light possesses a few absorption lines.

For the absorption cell 8 using, for example, a $C_2H_2$ gas, the absorption line exists for each wavelength of about 0.9 nm to 1 nm.

The half value width of the absorption line differs depending upon the pressure (density) of the sealed gas in the absorption cell 8.

The pressure of the sealed gas is adjusted with respect to the absorption cell 8 in accordance with a measuring resolution of the diffraction grating 2. For the absorption cell 8 using a $C_2H_2$ gas the half value width of about 1 GHz is obtained under a sealed pressure of 100 Torrs.

Figure 9:
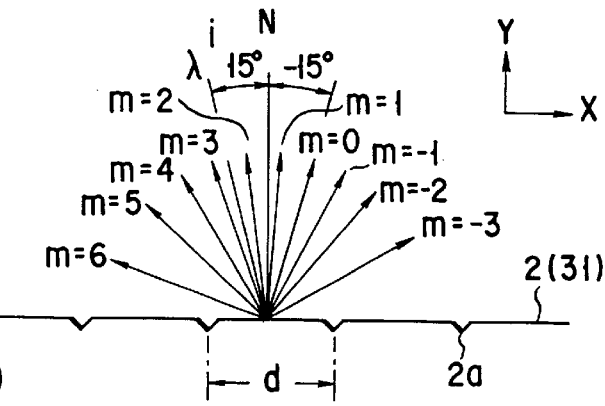
FIG. 9 is a view showing the order of diffraction light by a diffraction grating and its directions.
Figure 10:
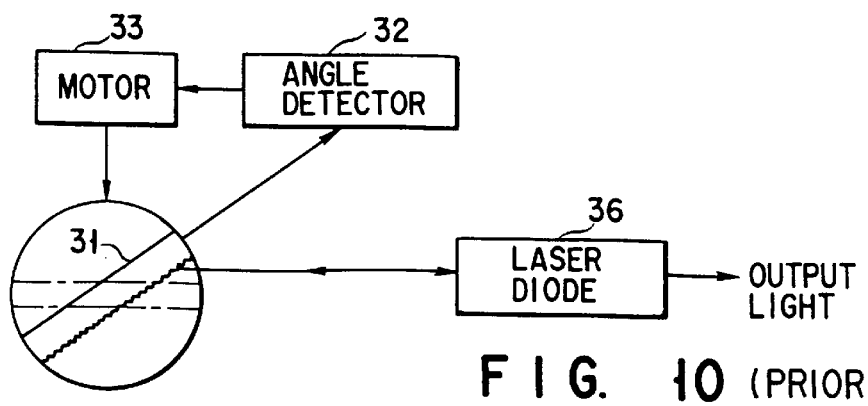
FIG. 10 is a view showing a conventional tunable wavelength light source.

The diffraction grating 2 has a greater number of grooves 2a provided in the surface at predetermined intervals and the transmitted light coming from the absorption cell 8 side is reflected on a smooth surface between the grooves 2a toward the reference light receiving unit 3 side (see FIG. 9).

The reference light receiving unit 3 receives the diffracted light from the diffraction grating and an electric signal corresponding to that received light amount is output to the calculating unit 6.

The angle detector 4 detects the rotation angle of the diffraction grating 2 and is comprised of an encoder for outputting a pulse each time the diffraction grating 2 is rotated at a rate of a predetermined angle, a potentiometer for developing a voltage due to a variation of a resistive value resulting from the rotation of the diffraction grating 2, and so on.

Stated in more detail, with the diffraction grating 2 whose rotation is controlled in a range of, for example, 0° to 40°, the calculation unit 6 attaches a number to a pulse output from the encoder as the detector 4, or to a voltage at the potentiometer, for each predetermined angle of a range 0° to 40°, though being not illustrated, and allocates the absolute value of the wavelength to the number.

In the range of, for example, 0.6 to 1.75 μm for the later-described optical spectrum analyzer and in the range of, for example, 1.4 to 1.7 μm, correspondence is taken by the calculation unit 6 to the wavelength of the transmitted light from the absorption cell 8.

The drive unit 5 is equipped with a motor and, when the wavelength is set by the operator via the calculation unit 6 though being not illustrated, the motor is driven in accordance with a table on the calculation unit so that the diffraction grating 2 may be rotated to a position to which this wavelength is allocated.

The drive unit 5 drives the diffraction grating 2 in normal/reverse rotation so as to perform scanning in a predetermined angle range (for example, 0° to 40) with a horizontal state as a reference as indicated by a dot-dash line.

Although being omitted in illustration, the drive unit 5 drives the motor, after a later-described correction, on the basis of the correction data from the calculation unit 6 to cause the diffraction grating 2 to be driven in rotation motion.

The above-mentioned calculation unit 6 is comprised of a microcomputer equipped with, for example, a CPU, ROM and RAM and previously stores, in the form of a table, the rotation angle data of the diffraction grating 2 corresponding to the wavelength of the light to be measured and data, such as a voltage value, of the potentiometer as the angle detector 4 corresponding to the width of the wavelength.

The calculation unit 6 performs predetermined signal-processing for calculating the rotation angle (correction data) of the diffraction grating 2 on the basis of the input data, such as the wavelength set by the operator, electric signal from the reference light receiving unit 3, and angle detection signal from the angle detector 4.

The calculation unit 6 calculates, as the rotation angle of the diffraction angle 2 (for example, the angle with the horizontal position as the reference), a correction amount corresponding to a displacement relative to an angle detection signal (the pulse number of the encoder or voltage of the potentiometer) of the angle detector 4 given an allocated wavelength of the to-be-measured light, though being omitted in illustration, based on the absolute value of the wavelength of an absorption line when the reference light receiving unit 3 receives the diffracted light of a wavelength component with that absorption line present therein.

In the apparatus for detecting the rotation angle of the diffraction grating thus structured, when the light is incident on the absorption cell from the light source 7, transmitted light having a spectrum, that is, a spectrum absorbing only a wavelength component with the absorption line present therein, exits form the absorption cell 8 without being affected by a variation in the environmental conditions.

The diffraction grating 2 receives the transmitted light and the reference light receiving unit 3 receives it as diffracted light from the diffraction grating 2.

Through the utilization of a variation in level of the diffracted light of the diffraction grating 2 produced due to each absorption line in the absorption cell 8 ($\lambda 1$, $\lambda 2$ in FIG. 1) differing in absorptivity, the calculation unit 6 identifies the diffracted light, that is, light received by the reference light receiving unit 3, as emerging due to the absorption line of any specified wavelength and calculates the rotation angle of the diffraction grating 2.

Stated in more detail, the calculation unit 6 compares the pulse number, that is, a pulse number of the encoder as the angle detector 4, or a voltage value of the potentiometer, with the tabled data when the reference light receiving unit 3 receives the diffracted light and calculates the rotation angle of the diffraction grating 2 corresponding to the wavelength of the light at that time.

Here, explanation will be given below of the measuring principle for calibrating the wavelength data previously stored in table form.

First, this measurement is carried out with the use of the following equation (2).

$$m\lambda = A \sin \theta$$

where
m : diffraction order of the diffracted light;
$\lambda$: wavelength
A : constant of the optical system
$\theta$: displacement angle with respect to an origin corresponding to the position (angle) of the diffraction grating when 0-order light is received.

In the equation (2), the constants to be found are the constant A of the optical system and displacement angle $\theta$.

Here, in order to find the displacement angle $\theta$, it is necessary to obtain a count value of the encoder, as the angle detector 4, allocated to the 0-order light origin.

If the count value of the encoder at the 0-order light's origin and constant A of the optical system are found with the reference light, it follows from the equation (2) that it is possible to find a relation of the wavelength $\lambda$ and count value of the encoder 4.

Figure 7:
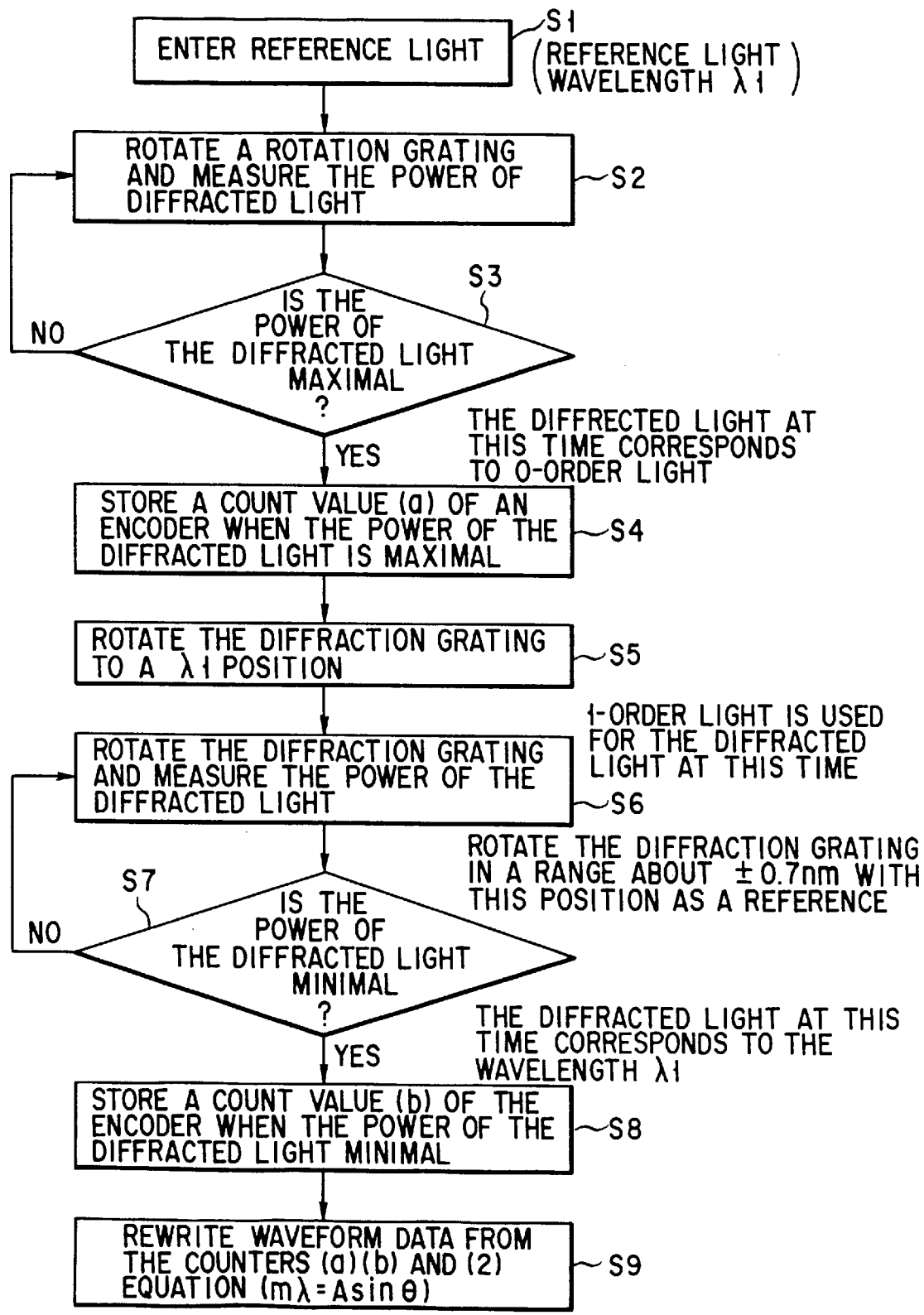
FIG. 7 is a flow chart for explaining a reference position measuring principle.
Figure 8:
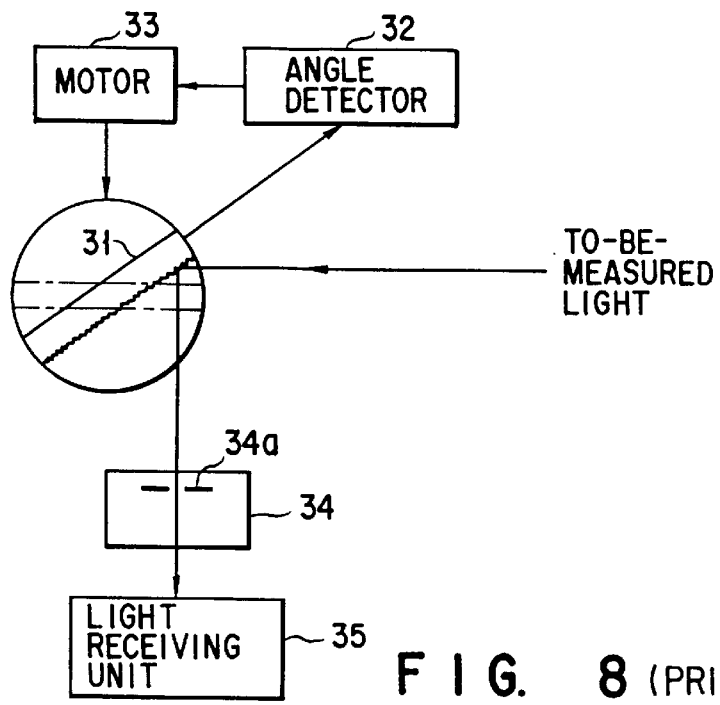
FIG. 8 is a schematic view showing a conventional optical spectrometer apparatus.

Stated in more detail, in the structure shown in FIG. 1, reference light of a wavelength $\lambda 1$ is input from the light source 7 to the diffraction grating 2 as indicated in a flow chart of FIG. 7—step S1.

At step S2, the power of the diffracted light obtained by the rotation of the diffraction grating 2 is measured by the reference light receiving unit 3 and calculation unit 6.

It is decided, at step S3, whether the power of the diffracted light is maximal or not.

When, by that decision, the power of the diffracted light becomes maximal, the diffracted light at that time is regarded as corresponding to the 0-order light and the count value (a) of the encoder 4 is stored at step S4.

Then, with the use of the 1-order light of the diffracted light the diffraction grating 2 is moved to a position of a wavelength $\lambda 1$ on the basis of the waveform data previously stored—step S5.

At step S6, the power of the diffraction grating 2 is measured by rotating the diffraction grating 2.

Stated in more detail, at this time, the diffraction grating 2 is rotated in a wavelength range of about ±0.7 nm with the position of the wavelength $\lambda 1$ as a reference.

Then at step S7, it is decided, this time, whether the power of the diffracted light is minimal or not.

When the power of the diffracted light is minimal, the diffracted light at that time is regarded as corresponding to the waveform λ1 and the count value (b) of the encoder 4 is stored at step S8.

At step S9, the sin θ in equation (2) is found from the count values (a), (b) stored as set out above and the constant A of the optical system is found from the sin θ, m=1 and λ=λ1. Based thereon, the wavelength is rewritten as the wavelength data.

In the apparatus, according to the present invention, for detecting the rotation angle of the diffraction grating, as set out above, use is made, as a waveform reference, of the gas absorption cell unaffected by the variation of the environmental condition and, without being affected by the variation of the environment such as the atmospheric temperature, humidity and pressure, it is possible to achieve an improvement in the absolute value of the wavelength of the diffracted light coming from the diffracted grating 2 and to also accurately detect the rotation angle of the diffraction grating 2 with respect to the wavelength at that time.

The absorption line can also be determined, in place of from the difference in absorptivity of the respective absorption lines, from an interval (Δλ in FIG. 1) present in the absorption line in which case attention is paid to the interval present at the absorption line.

FIG. 2 is a schematic view showing an apparatus, according to the present invention, for detecting a rotation angle of a diffraction grating.

The rotation angle detection apparatus shown FIG. 2 is of such a type that a waveform stabilizing light source 11 is used in place of the waveform reference light source of a structure as shown in FIG. 1. The remaining part of the apparatus is the same as that of FIG. 1 and any further explanation thereof is omitted.

Usually, the output light of a laser diode single unit used as the light source has its center wavelength varied due to the variation of the environmental conditions.

In order to solve this problem, the wavelength stabilizing light source 11 comprises, in addition to a light source 12 comprised of a laser diode for outputting light of a predetermined wavelength, a light splitting unit 13, absorption cell 8, light receiving unit 14 for waveform control, and wavelength control circuit 15 and allows stabilized laser light to exit to a diffraction grating 2.

The light splitting section 13 is comprised of, for example, a beam splitter, photocoupler, etc.

The light splitting section 13 allows laser light which comes from the light source 12 to be split in two directions.

Of those split light beams, one light beam is incident on the absorption cell 8 for absorbing light of a specific wavelength and the other light beam is incident on the diffraction grating.

The light receiving unit 14 for wavelength control receives a light from the light source 12, as a light beam transmitted through the absorbing cell 8, and converts it to an electric signal and outputs the electric signal to the waveform control circuit 15.

The wavelength control circuit 15 receives an electric signal from the light receiving unit 14 and controls the light source 12 so that the strength of the transmitted light beam coming via the absorption cell 8 from the light source 12 becomes constant. By doing so, it is possible to make constant the wavelength of the light emerging from the light source 12.

Thus, the waveform stabilizing light source 11 allows the oscillation wavelength of the laser light which emerges from the light source 12 to be controlled in a manner to correspond to the absorption wavelength λ of the absorbing cell 8 and the waveform-stabilized light to exit to the diffraction grating 2.

In the rotation angle detection apparatus according to the second embodiment, a calculation unit 6 decides, as an absorbing line, a point at which the power of the diffraction light received by a reference light receiving unit 3 becomes maximal and calculates the rotation angle of the diffraction grating in the same way as set out in conjunction with the above-mentioned first embodiment.

Figure 3:
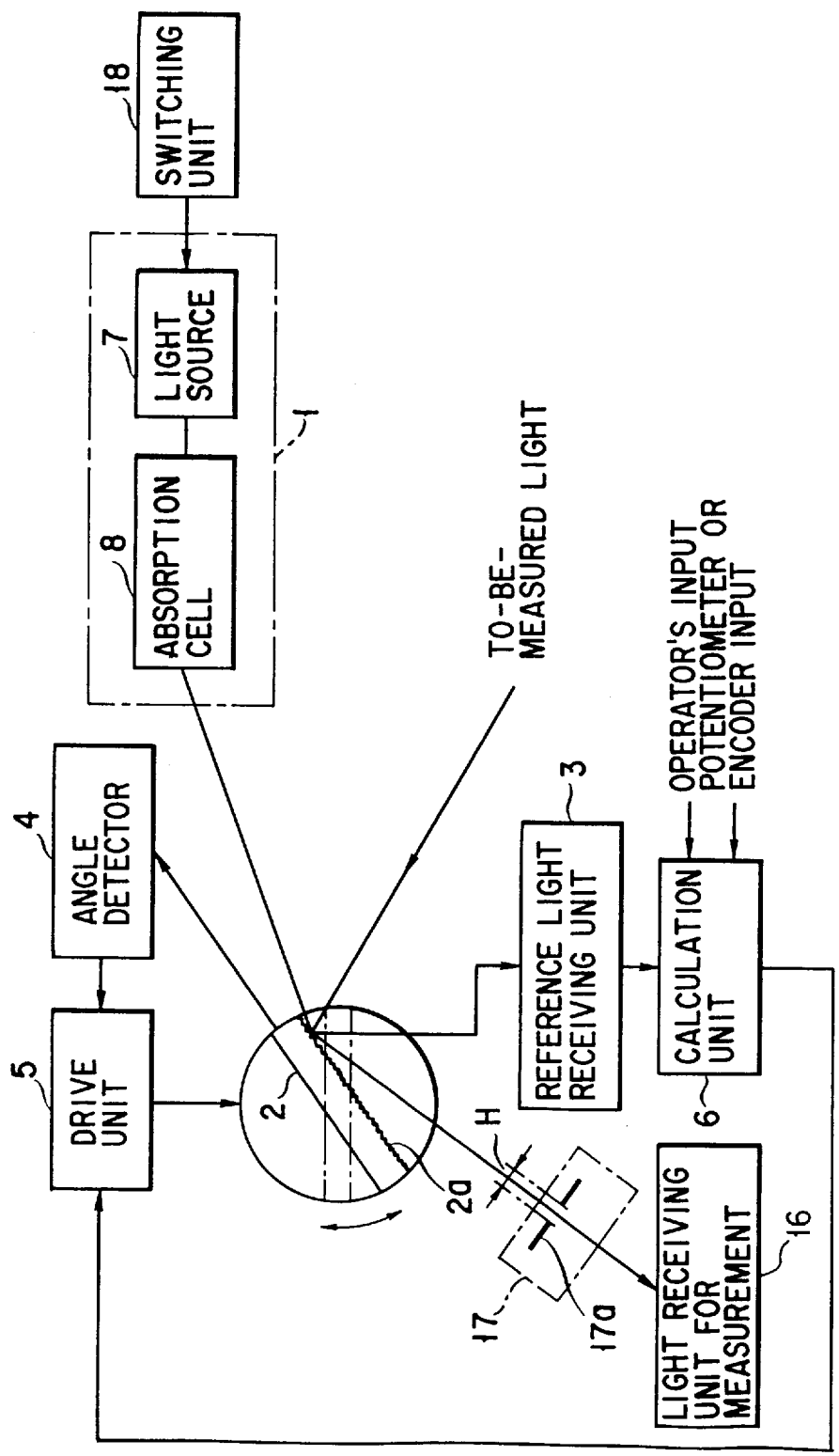
FIG. 3 is a schematic view showing on optical spectrum analyzer as an optical spectrometer apparatus to which the present invention is applied.

FIG. 3 is a schematic view showing the application, to the optical spectrum analyzer, of the rotation angle detection apparatus shown in FIG. 1.

The optical spectrum analyzer includes not only the rotation angle detection apparatus but also a light receiving unit 16 for measurement, slit mechanism and switching unit 18.

Though in FIG. 3 the reference light from the waveform reference light source 1 and light to be measured are illustrated as being incident on the diffraction grating 2 at different places, they are incident on the same position, or a position very near to that position, in actual practice.

The light receiving unit 16 for measurement receives a diffracted replica of the to-be-measured light incident on the diffraction grating 2.

The above-mentioned slit mechanism 17 includes a slit 17a on an optical axis between the diffraction grating 2 and the light receiving unit 16.

This slit is so provided as to narrow down the diffraction light and conduct it to the light receiving unit in a way to eliminate any excess light portion, because the diffracted light from the diffraction grating 2 is reflected in a given broadening range.

By making the slit width H of the slit mechanism 17 variable the narrowing-down extent of the diffracted light from the diffraction grating 2 is set to an optimal state to enhance a spectral resolution.

The switching unit 18 is comprised of a switch operated by, for example, an operator and, in order to prevent any interference between the to-be-measured light and the reference light, the ON/OFF switching of the waveform reference light source 1 is effected by the operation of the switch.

The switching unit 18 may be so configured as to allow any one of the reference light from the waveform reference light source 1 or the to-be-measured light to be incident on the diffraction grating 2.

If the reference light from the wavelength reference light source 1 and to-be-measured light are incident in a way to be shifted in a length or in a width direction, it is possible to omit the structure of the switching unit 18.

A drive unit scans the diffraction grating 2 through a predetermined angle range with a horizontal state as a reference and, when correction data calculated by the calculation unit 6 is input, rotationally drives the diffraction grating 2 through a rotation angle based on the correction data.

In the optical spectrum analyzer thus constructed, the diffraction grating 2 is rotationally driven to an allocated position corresponding to the wavelength (the wavelength of the to-be-measured light) set by the operator.

In this state, with the use of an absorption cell 8 having an absorption line matched to the wavelength of the to-be-measured light, the switching unit 18 is rendered ON to allow light which comes from the wavelength reference light source 1 to exit toward the absorption cell 8.

The light having an absorption spectrum corresponding to only an absorption line-existing waveform component is exited as transmitted light from the absorption cell 8.

The diffraction grating 2, receiving the transmitted light, sends diffracted light so that it is received by the reference light receiving unit 3.

When the diffracted replica of the transmitted light having a spectrum absorbing only the absorption line-exiting waveform component is received by the reference light receiving unit 3, then correction data corresponding to an angle detection signal from an angle detection signal from an angle detector 4, that is, the angle detection signal allocated to the wavelength of reference light, though being omitted in illustration, on the basis of the absolute value of an absorption line wavelength at that time, is calculated as the rotation angle of the diffraction grating 2 as set out above.

The drive unit 5 rotatably drives the diffraction grating 2 through a rotation angle range based on the calculated correction data.

This ends the correction of the rotation angle of the diffraction grating 2 by the wavelength reference light source 1.

In this state, the switching unit 18 is rendered OFF, stopping the exiting of the light from the wavelength reference light source 1 and entering to-be-measured light into the diffraction grating 2.

The diffraction grating 2 receives the to-be-measured light and sends diffracted light 2 to that slit 17a in the slit mechanism 17 where it is narrowed down. The narrowed-down signal is received by the light receiving unit 16 for measurement and the wavelength distribution of the to-be-measured light is detected based on the absolute value of the wavelength at that time.

By doing so, the optical spectrum analyzer shown in FIG. 3 suppress a variation in the absolute value of the wavelength of the diffracted light resulting from a variation under the environment such as the atmospheric temperature, humidity and atmosphere and can enhance the accuracy with which the wavelength is measured.

Figure 4:
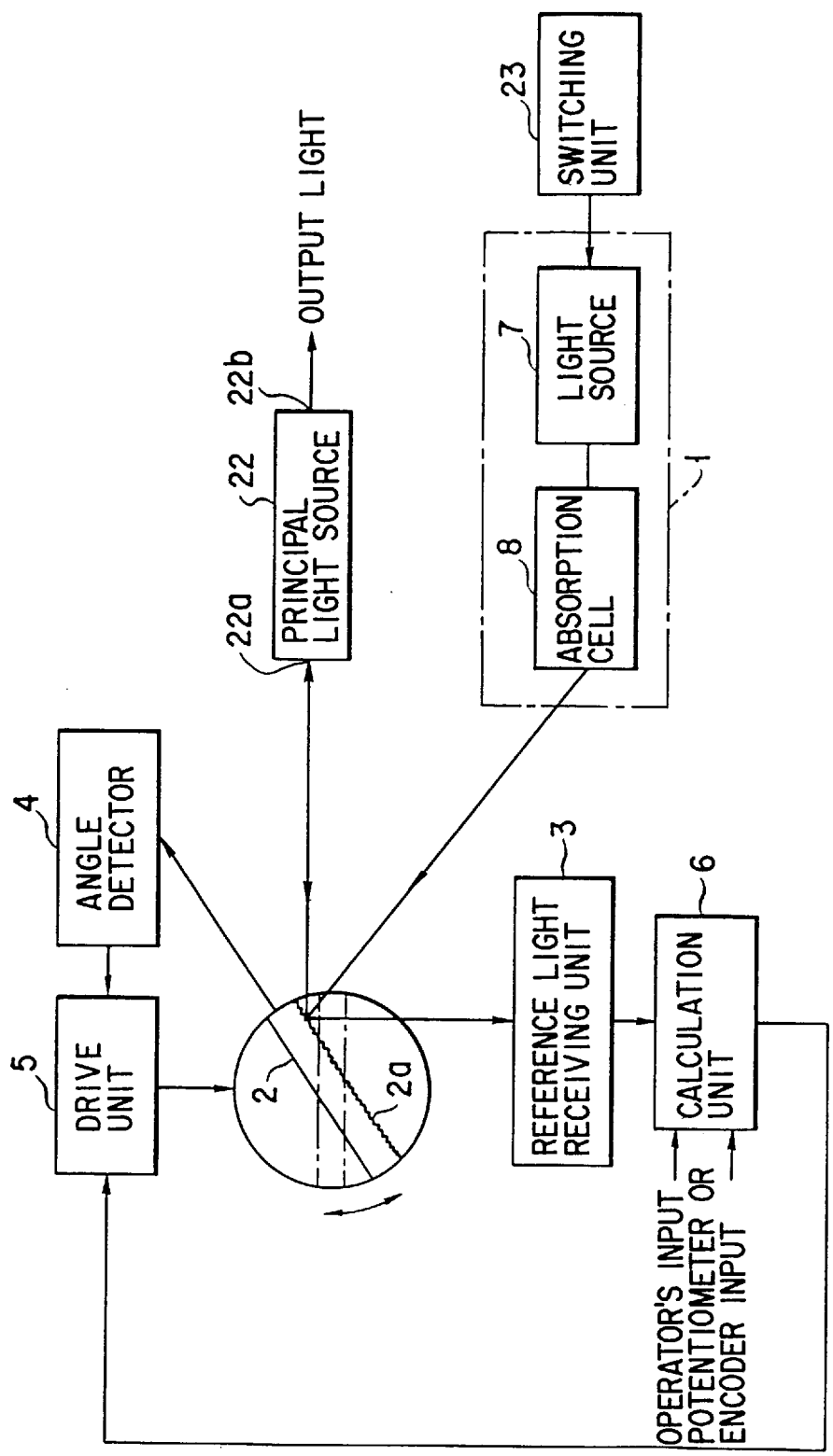
FIG. 4 is a schematic view showing a tunable wavelength light source to which the present invention is applied.

FIG. 4 is a schematic view showing the application, to a tunable wavelength light source, of the rotation angle detection apparatus shown in FIG. 1.

The tunable wavelength light source 21 includes not only the structure of the rotation angle detection apparatus but also a principal light source 22 and switching unit 23.

Though, in FIG. 4, reference light coming from a wavelength reference light source 1 and light coming from the principal light source 22 are illustrated as being incident on a diffraction grating 2 at two different positions, they are incident on the same position, or a position near to that position, in actual practice.

The above-mentioned principal light source 22 is comprised of a laser diode.

The light is reciprocably moved back and forth between one end face 22a of the principal light source 22 and the diffraction grating 2 located on that optical axis and resultant resonant light is output from the other end face 22b and, by doing so, an external cavity type tunable wavelength light source is realized.

The switching unit 23 is comprised of a switch operated by, for example, the operator and, in order to prevent interference between the light from the principal light source 22 and the light from the wavelength reference light source 1, the ON/OFF switching of the wavelength reference light source 1 is effected by the operation of that switch.

The switching unit 23 may be so constructed as to enable any one of the light from the wavelength reference light source or light from the principal light source 22 to be incident on the diffraction grating 2.

Further, if the reference light from the wavelength reference light source 1 and light from the principal light source 22 are made incident on the diffraction grating 2 by shifting them in a length or in a width direction of the diffraction grating 2, then it is possible to omit the switching unit 23.

A drive section 5 for scanning the diffraction grating through a predetermined angle range with a horizontal state as a reference rotationally drives the diffraction grating 2 through a rotation angle corresponding to correction data when the correction data calculated by a calculation unit 6 is entered.

In the tunable wavelength light source thus arranged, first the diffraction grating 2 is rotated to a position (wavelength of the principal light source 22) allocated to a wave length set by the operator.

With the use of an absorption cell 23 possessing an absorption line matched to the wavelength of light from the principal light source 22, the switching unit 23 is turned ON to allow light to be incident on the absorption cell 8 from a light source 7 in the wavelength reference light source 1.

The light possessing a spectrum absorbing only an absorption line-existing wavelength component is sent as transmitted light from the absorption cell 8 to the diffracted grating 2.

The diffracted light resulting from the reception of the transmitted light is received by a reference light receiving unit 3.

When the diffracted replica of the transmitted light possessing the spectrum absorbing only the absorption line-existing wavelength component is received by the reference light receiving unit 3, the calculating unit 6 calculates, as a rotation angle of the diffraction grating 2, correction data corresponding to an angle detection signal from an angle detector 4, that is, a signal allocated to the wavelength of the light from the wavelength reference light source 1, though being omitted in illustration, on the basis of the absolute value of the absorption line wavelength at that time.

The drive unit 5 rotationally drives the diffraction grating 2 through an angle corresponding to the calculated correction data.

By doing so, the correction of the diffraction angle of the diffraction grating 2 is finished by the wavelength reference source 1.

In this state, the switching unit 23 is turned OFF, stopping the exiting of the reference light from the waveform reference light source 1 and exiting light from one end face 22a of the principal light source 22 to the diffraction grating 2.

The incident light from the one end face 22a of the principal light source 22 is reciprocated between the diffraction grating 2 and the one end face 22a of the principal light source 22 and the resultant light is output from the other end face 22b of the principal light source 22.

By doing so, the tunable wavelength light source shown in FIG. 4 suppresses a variation in the wavelength of the diffracted light from the diffraction grating 2 resulting from a variation in the environmental condition, such as the atmospheric temperature, humidity and pressure and it is, therefore, possible to enhance the accuracy with which the wavelength oscillates.

In the aspect of the respective embodiment, although the transmitted light is incident on the diffraction grating 2 via the absorption cell 8 and the correction of the diffraction angle is made by receiving only a 1-order diffracted light (m=1), it is possible that, in addition thereto, the diffraction grating 2 is also rotated with the incident light intact. If, by doing so, the diffraction angle is corrected by sequentially receiving 2- and 3-order diffracted light, it is possible to correct the rotation angle of the diffraction grating 2 more accurately in a broader range.

Figure 5:
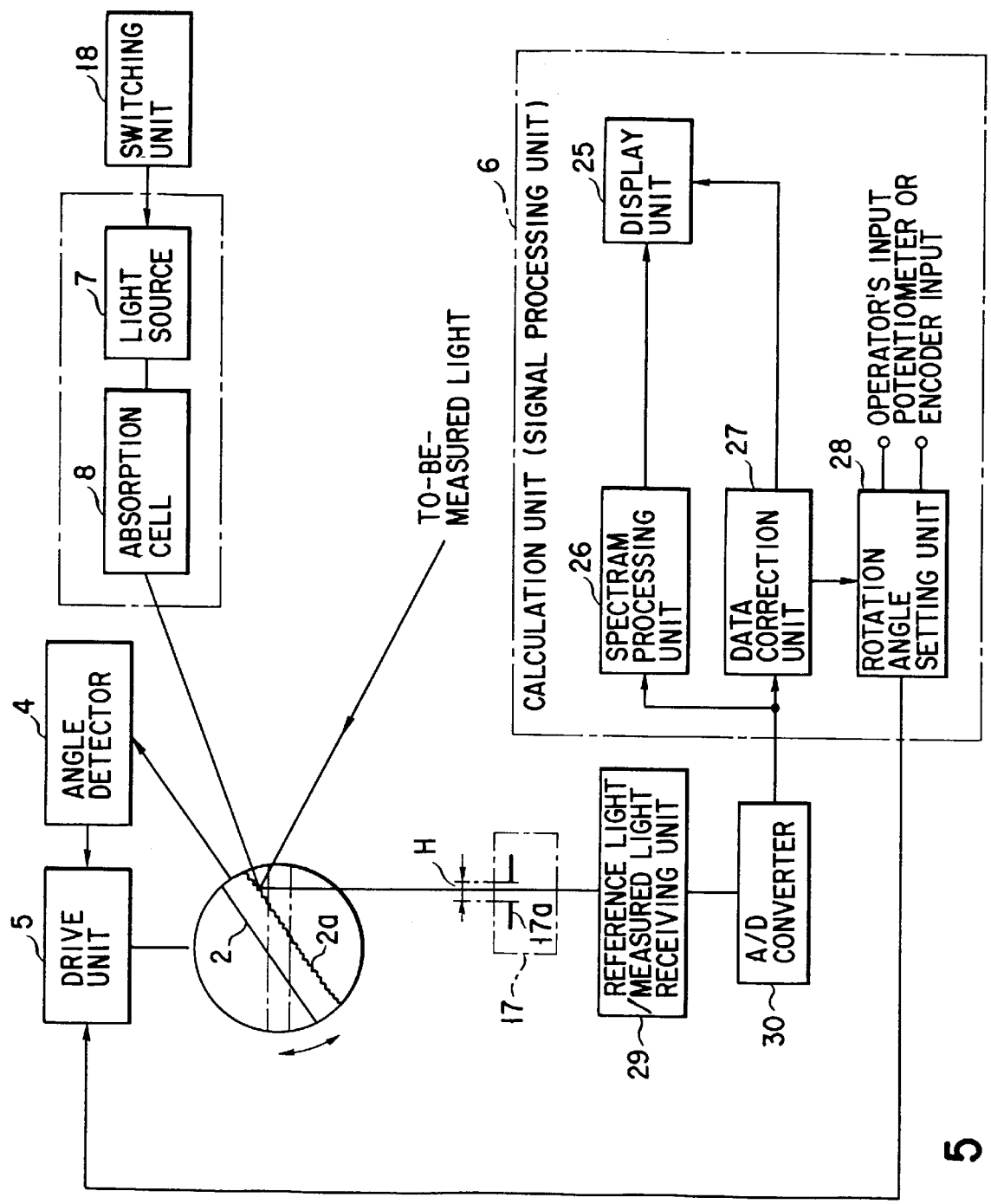
FIG. 5 is a schematic view showing an optical spectrum analyzer to which the present invention is applied.

In the aspect of the respective embodiment, although the motor of the drive unit 5 is driven by the correction data calculated by the calculation unit 6, if a structure is an optical spectrum analyzer type equipped with a display 25 as shown in FIG. 5, it may be possible to correct the graduations representing practical wavelength on a display unit 25 at a display screen, as shown in FIGS. 6A, 6B, on the basis of the correction data calculated by a calculation unit 6.

That is, FIG. 6A shows the case where, instead of changing those wavelengths λa, λb on the display screen, the display position of the spectra is so displayed as to be changed from a solid line to a broken line as indicated on FIG. 6A.

FIG. 6B shows the case where the wavelengths λa, λb are changed to λa' (=λa ±Δλa), λb' (=λb ±Δλb) on the display screen.

The light spectrum analyzer shown in FIG. 5 uses a reference light/measured light receiving unit 29 constituting a combination of the reference light receiving unit 3 and the light receiving unit 16, for measurement, in FIG. 3.

The aspect of switchingly receiving diffracted light of the diffraction grating 2 corresponding to the reference light or measured light, by a reference light/measured light receiving unit 29, is the same as in FIG. 3.

An electric signal from the reference light/measured light receiving unit 29 is converted, by an A/D converter 30, either illustrated or omitted in explanation in FIGS. 1 to 4, from an analog to a digital signal and input to a calculation unit (signal processing unit) 6.

In this case, a rotation angle setting section 28 equipped with the calculation unit (signal processing unit) 6 has wavelength-versus-angle data initially stored in table format and, upon receipt of the value of a wavelength set by the operator, sends, to a drive unit 5, angle data for driving the drive unit to allow a rotation grating 2 to take a rotation angle corresponding to the set wavelength value.

A data correction section 27 in the calculation unit 6 receives a digital signal from the A/D converter 30 at a time of selecting reference light from a switching unit 18 and calculates the above-mentioned correction data.

The correction data calculated by the data correction unit 27 is sent to a display unit 25 and to a rotation angle setting unit 28.

When later-described spectrum data is displayed based on the correction data, a display unit 27 corrects graduations representing a substantial wavelength on a display screen as set out above.

The rotation angle setting section 28 corrects the above-mentioned wavelength-versus-angle data based on the correction data and effects the correction of the diffraction angle so that corrected angle data is sent to the drive unit 5 to rotate the diffraction grating 2.

A spectrum processing unit 26 in the calculation unit 6 performs processing on a digital signal from the A/D converter 30, with switching effected by the switching unit 18 to to-be-measured light, and performs display processing and sends data as spectrum data to the display unit 25.

The calculation unit (signal processing unit) 6 as shown in FIG. 5 is so arranged as to incorporate its requisite parts in the calculation unit 6 as shown in FIGS. 1 to 4.

As set out above, a first optical spectrometer apparatus according to the present invention is characterized in that, in a light splitting device equipped with a rotatable diffraction grating 2 for receiving incident light, splitting it and outputting it, it comprises a light source 7 having a broader emission spectrum, an absorption cell 8 for receiving light from the light source, allowing light of a specific wavelength to pass through and outputting it, and a reference light receiving unit 3 for receiving the light of the specific wavelength split by the diffraction grating and converting it to an electric signal.

Further, a second optical spectrometer apparatus is characterized in that, in a light splitting device equipped with a rotatable diffraction grating 2 for receiving incident light, splitting it and outputting it, it comprises a light reference light source 11 having an absorption cell 8 for absorbing light of a specified wavelength, a laser diode 12 oscillatable with a wavelength absorbing cell, a light splitting unit 13 for allowing light which comes from the laser diode to be split into two light beams, a waveform-controlling light receiving unit 14 for allowing that first light beam which originates from the laser diode and which comes, as such, from the light splitting unit to be incident on the absorbing cell, for receiving the first light beam, as a transmitted light, from the absorption cell and for converting it to an electric signal, and a control circuit 15 for receiving the electric signal from the wavelength-controlling light receiving unit and for controlling an oscillation wavelength of the laser diode so that the strength of the first light beam originating from the laser diode and transmitted through the absorption cell becomes constant, a light splitting unit equipped with a rotatable diffraction grating 2 for receiving that second light beam originating from the laser diode and split, as such, by the light splitting unit and for splitting it, and a reference light receiving unit 3 for receiving the second light originating from the laser diode and split by the light splitting unit and for converting it to an electric signal.

A third optical spectrometer apparatus is equipped with the structure of the first or the second optical spectrometer device and includes a light receiving unit, for measurement, for receiving diffracted light involved by to-be-measured light incident on the diffraction grating, an angle detector 4 for detecting the rotation angle of the diffraction grating, a calculation unit 6 for calculating an amount of correction of the rotation grating corresponding to the angle detector's signal given an allocated absolute wavelength of the to-be-measured light on the basis of the diffracted light of the above-mentioned absorption line-existing wavelength component received by the reference light receiving unit, and a drive unit for rotationally driving the diffraction grating through a predetermined angle range and, at the same time, rotationally driving the diffraction grating through only an angle corresponding to the correction amount.

A tunable wavelength light source according to the present invention is equipped with the first or the second optical spectrometer device and comprises a principal light source 22 for reciprocating light, exiting from one end face 22a, back and forth relative to the diffraction grating and for outputting resonant light from the other end face 22b, an angle detector 4 for detecting the rotation angle of the diffraction grating, a calculation unit 6 for calculating a correcting amount of the rotation angle of the diffraction grating corresponding to the angle detector's signal given an allocated wavelength of the principal light source on the basis of diffraction light of the above-mentioned absorption line-existing wavelength component received by the reference light receiving unit, and a drive unit 5 for rotationally driving the diffraction grating through a predetermined angle range and, at the same time, rotationally driving the diffraction grating through only an angle corresponding to the correction amount.

In the first or the second optical spectrometer apparatus, light exiting from the light source unit 7 utilizing the absorption line of a gas, or from the reference light source unit 11, is incident on the diffraction grating 2.

The diffraction light receiving unit 3 receives its diffracted light and, from the diffracted light of the absorption line-existing wavelength component, it is possible to know the rotation angle and diffraction angle of the diffraction grating 2 at the wavelength at that time.

In the above-mentioned third optical spectrometer apparatus, the diffraction grating 2 is rotationally driven in a range given an allocated wavelength of the to-be-measured light.

While the diffraction grating 2 is rotationally driven, light is incident from a wavelength reference light source 1, or the reference light source unit 11, with the use of the absorption cell possessing an absorption line matched to the wavelength of the to-be-measured light.

The diffracted light involved by the incident light at this time is received by the reference light receiving unit 3.

When the diffracted light of the absorption line-existing wavelength component is received by the reference light receiving unit 3, the calculation unit 6 calculates, as the rotation angle of the diffraction grating 2, the correction data corresponding to a signal of the angle detector 4, that is, the angle detector's signal given an allocated wavelength of the to-be-measured light on the basis of the absolute value of the waveform of the absorption line at that time.

The drive unit 5 rotationally drives the diffraction grating 2 through only a rotation angle corresponding to the correction data calculated by the calculation unit 6.

When, in this state, the to-be-measured light is incident on the diffraction grating 2, the diffracted light of the diffraction grating 2 involved by the incident light is received by the light receiving unit 16 for measurement and the wavelength distribution is detected as a distribution corresponding to the absolute value of the wavelength at that time.

In the above-mentioned tunable wavelength light source, the diffraction grating 2 is rotationally driven in a range given an allocated wavelength of the principal light source 22.

While the diffraction grating 2 is rotationally driven, the light is incident on the absorption cell 8 from the waveform reference light source 1, or the reference light source unit 11, with the use of the absorption cell 8 possessing the absorption line matched to the wavelength of the principal light source 22.

The diffracted light involved by the incident light at this time is received by the reference light receiving unit 3.

When the reference light receiving unit 3 receives the diffracted light of the absorption line-existing wavelength component, the calculation unit 6 calculates, as the rotation angle of the diffraction grating 2, the correction data corresponding to the signal of the angle detector 4, that is, the signal given an allocated wavelength of the principal light source 22 on the basis of the absolute value of the wavelength of the absorption line at this time.

The drive unit 5 rotationally drives the diffraction grating 2 through only an angle corresponding to the correction data calculated by the calculation unit 6.

If, in this state, light is incident on the diffraction grating 2 from one end face 22a of the principal light source 22, the incident light reciprocates between the diffraction grating 2 and one end face 22a of the principal light source 22 and resonant light is output from the other end face 22b of the principal light source 22.

As explained above, according to the apparatus, according to the present invention, for detecting the rotation angle of the diffraction grating, it is possible to accurately detect the rotation angle of the diffraction grating, without affecting the environmental changes such as the atmospheric temperature, humidity and pressure, and to improve the accuracy of the absolute value of the wavelength of the diffracted light of the diffraction grating and accurately also detect the rotation angle of the diffraction grating with respect to the wavelength at its time. It is also possible to actually measure the diffraction angle without relying upon a theoretical value and to improve the accuracy of the absolute wavelength of the diffracted light.

According to the optical spectrum analyzer to which the present invention is applied, it is possible to enhance the measuring accuracy of the wavelength by suppressing a variation in error of the absolute value of the wavelength of the diffracted light resulting from an environmental variation, such as the atmospheric temperature, humidity and pressure and to largely improve the existing wavelength accuracy.

Further, according to the tunable wavelength to which the present invention is applied, it is possible to enhance the accuracy of the oscillation wavelength by suppressing a variation in the absolute value of the wavelength of the diffracted light due to the environmental variation such as the atmospheric temperature, humidity and pressure.

I claim:

1. An apparatus for detecting a rotation angle of a diffraction grating, which diffraction grating includes a rotatable diffraction grating for receiving incident light and exiting split beams, and a drive unit for rotating the rotatable diffraction grating, the apparatus further comprising:

an angle detecting unit for detecting a rotation angle of the rotatable diffraction grating;

a light source unit including a light source and an absorption cell, said light source unit exiting, to the rotatable diffraction grating, reference light of a wavelength range including a specified wavelength determined depending upon the absorption cell, the absorption cell being comprised of a tube sealed with a gas having an absorption line absorbing the reference light of a predetermined wavelength at all times without being affected by a variation in an environmental condition;

a reference light receiving unit for receiving a split reference light from the rotatable diffraction grating and converting the split reference light into an electric signal; and a signal processing unit which (i) detects an extreme value of the electric signal from the reference light receiving unit, which electric signal is obtained while the rotatable diffraction grating is rotated by the drive unit, (ii) receives a rotation angle output from the angle detecting unit when the extreme value is detected, and (iii) calculates a specified rotation angle corresponding to the specified wavelength.

2. The apparatus according to claim 1, wherein:

the light source unit comprises a waveform stabilizing light source including a light dividing unit, a light receiving unit for wavelength control, and a wavelength control circuit;

the light dividing unit divides light from the light source into a light component directed to the diffraction grating and a light component directed to the absorption cell;

the light receiving unit for waveform control is arranged to receive a light component which is directed to the absorption cell and which is transmitted through the absorption cell, and converts said received light component into an electric signal; and the wavelength control circuit controls an oscillation wavelength of the light source to make constant a strength of the light which is transmitted through the absorption cell, based on the electric signal from the light receiving unit and, by doing so, a wavelength of a light component directed from the absorption cell to the diffraction grating is so stabilized as to be matched to an absorption wavelength of the absorption cell.

3. The apparatus according to claim 1, wherein exit light from the absorption cell in the light source has a plurality of absorption lines and, through utilization of a different absorptivity in each of the plurality of absorption lines, the signal processing unit decides, from a variation in a split light level output from the diffraction grating, to which the split reference light received by the reference light receiving unit is matched to an absorption line of any wavelength, and calculates a corresponding rotation angle.

4. The apparatus according to claim 1, wherein the signal processing unit comprises:

a rotation angle setting unit having wavelength-versus-angle data, for receiving a set wavelength value and sending angle data for driving the driving unit to allow the rotatable diffraction grating to be set to a rotation angle corresponding to the set wavelength value; and data correcting means for correcting the wavelength-versus-angle data in the rotation angle setting unit with the use of the specified rotation angle calculated with respect to the specified wavelength.

5. The apparatus according to claim 4, wherein:

the apparatus is used for analyzing a spectrum of light to be measured; and the signal processing unit comprises means for supplying correction data from the data correction means to the drive unit in order to correct a diffraction angle of the diffraction grating prior to analyzing of the light to be measured.

6. The apparatus according to claim 5, further comprising:

a measurement light receiving unit for receiving a split light of light to-be-measured while the diffraction grating is being rotated in accordance with the set wavelength value, and converting the split light into an electric signal; and a spectrum processing unit for outputting the electric signal output from the measurement light receiving unit and the set wavelength value in a corresponding relation to each other.

7. The apparatus according to claim 5, further comprising:

a measurement light receiving unit for receiving a split light of light to-be-measured while the diffraction grating is being rotated in accordance with the set wavelength, and converting the split light into an electric signal; and a spectrum processing unit for calculating an electric signal in the set wavelength value from the electric signal output from the measurement light receiving unit based on waveform-versus-angle data corrected by the data correcting means and outputting the set wavelength value and electric signal in a corresponding relation to each other.

8. The apparatus according to claim 6, further comprising means for switching between the reference light and the light to-be-measured.

9. The apparatus according to claim 6, wherein the reference light receiving unit and the measurement light receiving unit comprise a single unit.

10. The apparatus according to claim 4, wherein:

the rotation angle detection unit of the diffraction grating is used for an external cavity type tunable wavelength source for reciprocating and resonating light between the diffraction grating and a principal light source so as to output tunable wavelength light; and the signal processing unit comprises means for supplying correction data from the data correction means to the drive unit in order to correct the rotation angle of the rotation grating prior to the outputting of the tunable wavelength light by the external cavity type tunable wavelength light source.

11. The apparatus according to claim 10, further comprising means for switching between the light source unit and the principal light source.

12. The apparatus according to claim 7, further comprising means for switching between the reference light and the light to-be-measured.

13. The apparatus according to claim 7, wherein the reference light receiving unit and the measurement light receiving unit comprise a single unit.

* * * * *